(12) United States Patent
Cannon et al.

(10) Patent No.: US 6,886,019 B1
(45) Date of Patent: Apr. 26, 2005

(54) OPTIMIZED SELECTION AND ACCESSING OF STORED FILES TO AVOID MOUNT AND POSITION THRASHING

(75) Inventors: David Maxwell Cannon, Tucson, AZ (US); Colin Scott Dawson, Tucson, AZ (US); Howard Newton Martin, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/571,673

(22) Filed: May 15, 2000

(51) Int. Cl.[7] .............................................. G06F 12/00
(52) U.S. Cl. ..................................... 707/204; 711/162
(58) Field of Search ............................... 707/200–205; 711/111, 162; 714/6

(56) References Cited

U.S. PATENT DOCUMENTS

| | | | |
|---|---|---|---|
| 5,163,148 A | | 11/1992 | Walls |
| 5,263,154 A | | 11/1993 | Eastridge et al. |
| 5,276,860 A | | 1/1994 | Fortier et al. |
| 5,276,867 A | | 1/1994 | Kenley et al. |
| 5,403,639 A | * | 4/1995 | Belsan et al. ............... 707/204 |
| 5,404,508 A | | 4/1995 | Konrad et al. |
| 5,559,991 A | | 9/1996 | Kanfi |
| 5,642,496 A | | 6/1997 | Kanfi |
| 5,737,763 A | | 4/1998 | Hilditch |
| 6,035,379 A | * | 3/2000 | Raju et al. .................. 711/162 |
| 6,047,294 A | * | 4/2000 | Deshayes et al. ............ 707/204 |
| 6,078,932 A | * | 6/2000 | Haye et al. .................. 707/204 |
| 6,119,131 A | * | 9/2000 | Cabrera et al. .............. 707/203 |
| 6,148,412 A | * | 11/2000 | Cannon et al. ................ 714/6 |
| 6,173,291 B1 | * | 1/2001 | Jenevein ...................... 707/200 |
| 6,286,078 B1 | * | 9/2001 | Fuld ........................... 711/111 |
| 6,339,778 B1 | * | 1/2002 | Kishi .......................... 707/200 |
| 6,397,308 B1 | * | 5/2002 | Ofek et al. .................. 711/162 |

FOREIGN PATENT DOCUMENTS

| | | | |
|---|---|---|---|
| EP | 0 675 490 B1 | 5/2000 | ........... G11B/19/00 |
| GB | 2 323 945 A | 7/1998 | ........... G11B/27/00 |

* cited by examiner

*Primary Examiner*—Greta Robinson
*Assistant Examiner*—Sathyanarayan Pannala
(74) *Attorney, Agent, or Firm*—Timothy N. Ellis; Oppenheimer Wolff & Donnelly LLP (57) ABSTRACT

A method for generating file copies with minimal mounting and positioning of storage volumes involves receiving a request to generate file copies specifying file selection criteria, identifying matching files meeting the selection criteria, locating the matching files on their storage volumes, and copying the files to a copy set. Determination of file copying order is optimized by placing greater emphasis on relative storage locations of matching files than on the order in which their copies are requested. Once a storage volume is mounted, all files stored on that volume are matched against the pending requests including future requests and if found to be the subject of a request, are copied from the mounted volume in optimal position-sensitive order. Copying from secondary storage is deferred until all copying from primary storage is complete.

18 Claims, 8 Drawing Sheets

OPTIMIZED SELECTION AND ACCESSING OF STORED FILES TO AVOID MOUNT AND POSITION THRASHING

BACKGROUND OF THE INVENTION

1. Field of the Invention

The present invention relates generally to data processing systems, and more particularly to storage management servers for optimizing selection and accessing of stored files to avoid mount and position thrashing.

2. Description of Related Art

Data processing systems typically require a large amount of data storage. Customer data, or data generated by users within the data processing system, occupy a great portion of this data storage. Effective data processing systems also provide backup copies of this user data to prevent a loss of such data. Many businesses view any loss of data in their data processing systems as catastrophic, severely impacting the success of the business.

A storage management server provides an effective means for protecting customer data. Generally, a client-server configuration includes several clients connected to a single server. The end users create client files and transfer these files to the server. The server receives the client files and stores them on attached storage devices. When used as a storage management system, the server manages the backup, archival, and migration of these client files. By storing the client file on an attached storage device, the server creates a first, or primary, copy of the client file. The server may, in turn, create additional backup copies of the client file for inclusion in the overall storage hierarchy to improve the data availability and data recovery functions of the storage management system. Clients may vary from small personal computer systems to large data processing systems having a host processor connected to several data storage devices. The server can also range from a small personal computer to a large host processor.

An advanced storage management server, such as Tivoli Storage Manager (formerly known as ADSM), maintains reference information about the client files copied within the attached storage volumes. The server uses a database to keep inventory information about the original client files and storage volume location information about the copies of the client files stored within the server. The inventory information typically includes a client system identifier, a client system directory, a client file name, and other attributes of the file. The location information typically consists of a storage volume identifier and a position within the storage volume among other storage attributes. In addition, the server database allows the server to assign a unique identifier to each client file stored within the attached storage volumes. Thus, the server can track individual files throughout the server storage component.

Accordingly, the server database introduces several advantages to the storage management server. The server can track multiple copies of an individual client file written to different storage volumes. By tracking secondary copies of the client file, the server improves the data availability to the client systems. For example, if a primary copy of a particular client file is inaccessible because it is stored on a destroyed volume or damaged media, the server can access an additional copy residing on a different storage volume and transfer the additional copy to the requesting client system. Further, the server can subsequently recover the unavailable primary copy of the client file from the secondary copy. The server needs both inventory and storage volume location information provided by the server database to accomplish the above-described data recovery.

A data processing system using a storage management server, including a file storage manager, stores files that have been backed up or archived from various client nodes. The server stores client data files in a storage hierarchy consisting of various media types (e.g., magnetic disk, tape, optical disk) and uses a database for tracking the attributes and storage location of each stored client file.

Another function of a storage management server is to select files that satisfy certain criteria, and transfer the files to another location. There are many situations in which the transfer of data to another location is necessary or desirable. For example, it may be desired to create a backup set that represents the latest set of files stored on the server for a particular client node. The backup set could be used for restoring files directly to a client node, without requiring use of a network, or for transporting these files to another server. Those skilled in the art will recognize that the creation of a backup set is only one example and that other applications are well-suited to the copy or transfer of data from one location to another. In general, the specification will refer to copied files as belonging to a copy set.

In this copying operation, data on the source server may be stored on various types of media or volumes. For example, storage media can be removable or non-removable, and can be accessed either sequentially or randomly. Typically, a storage management server can process files from different volumes types. For example, it can process data from random-access, non-removable volumes which do not have to be mounted each time they are accessed and are randomly searched; sequential volumes, such as tapes, which are mounted at the beginning of the volume and are sequentially processed; and random-access, removable volumes, such as optical disks, which are mounted for each search but randomly processed once mounted.

The description will continue in an illustrative sense with respect to storage volumes, which comprise random-access media and sequential-access media. Random-access media is considered to include media that is both non-removable and random-access. Sequential-access media is considered to include all removable media, whether it is accessed randomly or sequentially.

Information on random-access media, such as magnetic disk, can usually be transferred relatively efficiently. However, transferring data from sequential-access media can impose delays while the required volume is mounted. Moreover, additional delays may be required to position the media to the correct location on the storage volume.

Accordingly, one of the major challenges in generating a copy set or performing any copying operation is to discover how to efficiently copy numerous files from sequential-access media, such as magnetic tapes. The efficient copying should be done with minimal mounting and positioning of input volumes. Therefore, optimized selection and accessing of stored files should avoid mount and position thrashing, which occurs with excessive moving back and forth between the mounted volumes or positions within a volume.

In addition to problems encountered by certain types of media as just described, a further challenge arises from an efficiency problem inherent to the functionality of the copying operation. The problem stems from the utilization of two completely different views of the data, namely the inventory view and the storage view, in the copying operation.

Files are normally selected from inclusion in the copy set based on inventory view attributes of the data, important to the end user. Such attributes include the client node, filespace and file name information, and recency of the copy. As used in this specification, the term "filespace" refers to a logical space in the client's storage that can contain a group of files. For example, a filespace could be a logical partition or a directory and its subdirectories.

On the other hand, efficiency requires that files be transferred in some optimal order that depends on the location of these files within the server's storage hierarchy. This information is part of storage view attributes of the data and relates directly to the various types of storage media previously described.

Conventional solutions to the efficiency problem in utilizing both views typically include creating a list of files based on filter criteria which are evaluated using the inventory view. Files in the list are then sorted by their storage location and are transferred in sorted order, which represents the storage view. However, this approach requires a great deal of initial overhead to create and sort the list of files, which delays the transferring of files.

Therefore, there is a need in the art to provide a means whereby a copy set can be generated in optimal manner by considering both the inventory and the storage view of files, and without creation of a sorted list of files.

SUMMARY OF THE INVENTION

To overcome the limitations in the prior art described above, and to overcome other limitations that will become apparent upon reading and understanding the instant specification, the present invention discloses a method, apparatus, and article of manufacture for a computer-implemented technique for generating a copy set in such a way as to minimize mounting and positioning of storage volumes.

In accordance with the present invention, the method receives a copy set generation request specifying selection criteria for files to be included in a copy set, identifies matching files meeting the selection criteria, locates the matching files on their storage volumes, and copies the files to the copy set, ignoring the file order in the request but considering the proximity of the matching files to each other on the storage volumes. The method ensures that each matching file is included, without duplication, in the copy set, and also ensures that the files are copied with minimal delays in mounting and positioning of the storage volumes.

The storage volumes preferably include sequential-access volumes and random-access volumes; and stored files have a primary copy on a sequential-access volume or a random-access volume, and may have a secondary copy on a sequential-access volume. The copying is preferably attempted in the following order:

1. A request is made to copy a specific file to the target media.
2. If the specified file resides on random-access media, it is copied immediately and no further processing is required for this requested file. At this point, the method gets the next request.
3. Otherwise, if the file is available only on sequential media, the volume is mounted.
4. Once a volume is mounted, the method begins evaluating all files resident on that volume using information stored in the server database to determine which files are eligible for transfer and their positions on the volume. This determination is executed in a position-sensitive (position-optimal) manner so as to minimize positioning within the volume.
5. Each eligible file is copied in position-optimal order.
6. If, while processing a file on the volume, it is determined that the file can not be accessed due to a media defect or hardware failure and if this file also resides on a secondary volume, the secondary volume is added to a list for deferred processing.
7. If the last file on a volume spans to another sequential volume, the first volume is dismounted and the spanned-to, or second, volume is mounted. After mounting the second volume, the method continues processing from step (4) above.
8. Once all eligible files have been transferred from the volume and if the last file on this volume does not span to another volume, the method gets the next request.
9. Once the method has attempted to transfer all eligible files from their primary location, it begins to process any outstanding deferred secondary volumes by transferring all eligible files from each secondary volume in a position-optimal manner. Deferred copying from secondary volumes is handled by the same steps prescribed to primary copying and occurs in a similar preferential-based order.

The apparatus embodiment includes a computer having data storage volumes connected thereto and one or more computer programs, performed by the computer, for executing the above-described method for generating a copy set in such a way as to minimize mounting and positioning of the storage volumes.

The article of manufacture embodiment includes a computer program carrier readable by a computer and embodying one or more instructions executable by the computer to perform the above-described method steps for generating a copy set in such a way as to minimize mounting and positioning of storage volumes.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration of a specific embodiment in which the invention may be practiced. It is to be understood that other embodiments may be utilized as structural changes may be made without departing from the scope of the present invention.

Figure 1:
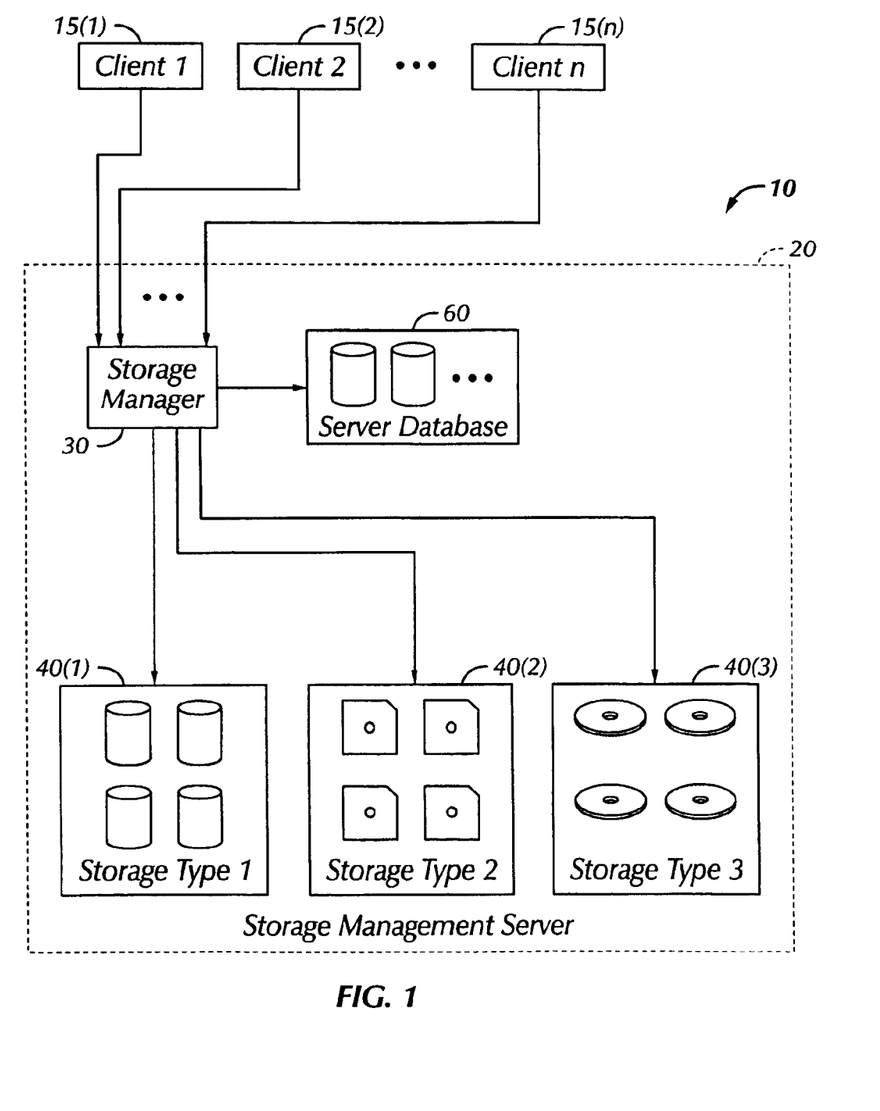
FIG. 1 is a block diagram of a data processing system showing a plurality of client systems coupled to a storage management server, according to the preferred embodiments of the present invention.
Figure 2:
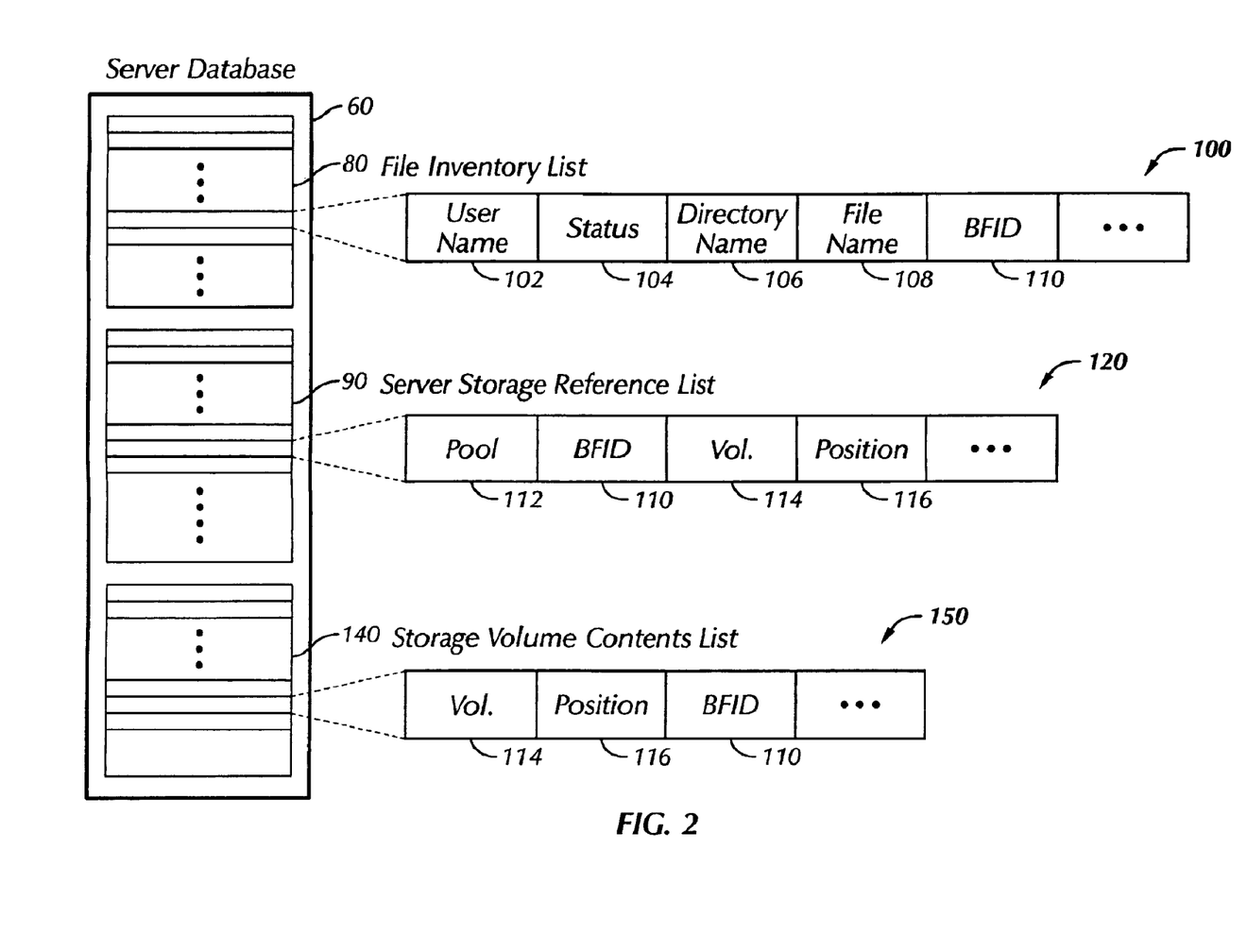
FIG. 2 is a diagram of a portion of the database included in FIG. 1 showing inventory, reference, and storage volume contents lists, according to the preferred embodiments of the present invention.

The present invention provides a means whereby a copy set can be generated in optimal manner by considering both the inventory and the storage view of files. Referring more particularly to FIGS. 1 and 2, like numerals denote like features and structural elements in the various figures. The invention is described as embodied in a data processing system of FIG. 1, using a storage management server to manage one or more copies of client files within the attached storage volumes. In FIG. 1 a data processing system 10 is shown having multiple client systems 15 coupled to a server system 20. The server system 20 includes a storage manager 30 coupled to a server database 60. The storage manager 30 is further coupled to a plurality of storage volumes 40. The storage volumes may consist of various types of storage media, such as magnetic disk, optical disk, or magnetic tape.

Each client system 15 creates original user data files, or client files, which are stored within the corresponding client system 15. The client systems 15 transfer client files to the server system 20. Transferring client files to the server 20 inherently provides a copy mechanism within the server 20 for these original client files. The storage manager 30 directs the client file to an attached storage volume 40. The server 20 stores a first, or primary, copy of the client file on a primary storage volume 40 and may also generate additional copies of the client file on secondary storage volumes 40. The storage manager 30 maintains inventory information about the client file and reference location information pertaining to the copies of the client file within the server database 60.

The server database 60 allows the server 20 to manage individual files within the server storage component 40. The server database 60 introduces advantages to the storage management server 20. The storage manager 30 can track multiple copies of an individual client file written to different storage volumes 40. If the primary copy of a client file is unavailable, the storage manager 30 can access a secondary copy from a different storage volume 40, should a secondary copy be available, using the reference location information in the server database 60. Moreover, the storage manager 30 can recover the primary copy of the client file from a backup copy. In addition, the server database 60 allows the storage manager 30 to coordinate incremental copy operations from a client system 15 to the server 20. The server database 60 denotes which client files have been added to the server storage 40 since a previous incremental copy operation was completed. Without the server database 60, the storage manager 30 must resort to full backup of client data.

FIG. 2 is a diagram showing three portions of the server database 60: a file inventory list 80, a server storage reference list 90, and a storage volume contents list 140. These lists are preferably tables and may also be lists such as linked lists. As stated previously, the server database 60 tracks individual file copies through the server 20. A system utilizing an embodiment of the present invention may include an inventory view that represents user attributes of a file and a storage view that represents storage location.

The inventory view employs a file inventory list 80, shown in FIG. 2, to identify files that match the specified criteria of files to be included in the copy set. An inventory list entry 100 provides inventory information about a client file and facilitates the identification of every file that is found to meet the criteria. Each file that is considered and compared to the criteria has a distinct identifier, denoted the bit-file identifier (bfid) 110. If the client sends multiple versions of the same file to the server, each of these versions is assigned a distinct bfid 110. Each file that is considered and found to match the criteria is identified by its bfid 110.

An inventory view entry 100 is expanded to show a portion of the inventory information. A server inventory entry 100 typically provides inventory information about the client file. In FIG. 2, a first field contains the user name 102, identifying which client system 15 owns the specified client file. A second field 104 maintains a status indicator 104 for the client file. A third field 106 provides the directory name 106 within the client system 15 where the client file originated. A fourth field 108 contains the file name 108 of the client file. Finally, the fifth field 110 contains the unique file identifier, bfid 110. After a file that matches particular criteria is determined and its bfid is identified, the file may be searched for on storage media.

The storage view utilizes a storage reference list 90, which contains various entries 120, and a storage volume contents list 140 containing entries 150. Each storage reference list entry 120 typically provides reference location information about a particular copy of the client file. A server storage 20 can be organized into sets of storage volumes 40, called storage pools. Each set, or pool, is homogenous with respect to media type, in that a pool contains only media of the same type. A file may be located within the server storage 20 by specifying the storage pool, the storage volume within the storage pool, and the position within the storage volume. The information in the entry 120 may be arranged so as to locate a file associated with a particular bfid as efficiently as possible. Accordingly, the entry 120 may contain information including a storage pool identifier 112, bfid 110, a storage volume identifier 114, and a position 116 within the storage volume, in that order. This is a reasonable exemplary ordering of information in that it directs the search for a file first to a pool 112 according to media type, and then to bfid. It is noted that in addition to providing file identification, the bfid 110 also serves the purpose of mapping the information within the inventory 80 to the reference location information within the reference list 90. Further, if a file spans multiple storage volumes on the server, a separate reference list entry 120 is used for each volume on which the file is stored.

Continuing with the exemplary embodiment of the present invention, once a volume that is known to contain a requested file has been mounted, file searching is directed by the storage volume contents list 140. Information stored in the entries 150 in this list are ordered by location within the volume such that all requested files stored on the volume may be copied in the order in which they appear, regardless of the order in which they are requested. A reasonable ordering of the information in the entries 150, then, would comprise the sequence: volume 114, position 116, and bfid 110. This ordering of information facilitates the efficient copying of all requested files on the mounted volume and ensures that once the method of the present invention begins processing a sequential or removable volume, all files on that volume are transferred in optimal order. The present invention, therefore, minimizes the mounting and positioning of volumes during acquisition of all the requested files in the inventory.

As supported by the layout of FIG. 2 and its associated description, the present invention provides a technique whereby a copy set can be generated in optimal manner by considering both the inventory and the storage view of files. The end result is that files are selected based on filter criteria of the inventory view, but are transferred without excessive mounting or positioning of volumes, according to the storage view. One advantage of the present invention is that the efficiency is achieved even if files must be accessed from secondary locations, due to media defects or other problems. Another advantage of this approach is that file transfer begins almost immediately, without the overhead of first sorting files according to their storage location.

In the present invention the inventory component identifies the matching files that meet the specified filter criteria and ensures that each matching file is included, without duplication, in the copy set. For each matching file, the inventory component invokes the storage component which locates the file in the storage hierarchy and copies the file to the copy set, in such a way as to minimize mounting and positioning of storage volumes.

The efficiency is supported by the key feature of the present invention, according to which the storage component does not necessarily copy files in the requested order. Instead, the storage component may anticipate a future request and transfer a file based on its proximity to other files in the storage hierarchy, even before it has been requested to do so. Alternatively, the storage component may receive a request to copy a file but defer processing if it is not possible to retrieve the file from its primary location. After the method has attempted to transfer all files from their primary locations it begins processing any deferred secondary volumes. This optimization, based on storage volume selection as well as file position within a storage volume, avoids mounting a secondary volume whenever a file cannot be transferred from the currently mounted primary volume. The method also ensures that files will be transferred from their primary location if it is possible to do so.

The inventory and storage components interact in a such a way as to ensure that every matching file is copied to the copy set, and that file transfer is performed in an optimal manner with regard to mounting and positioning of storage volumes.

Inventory Component

Figure 3:
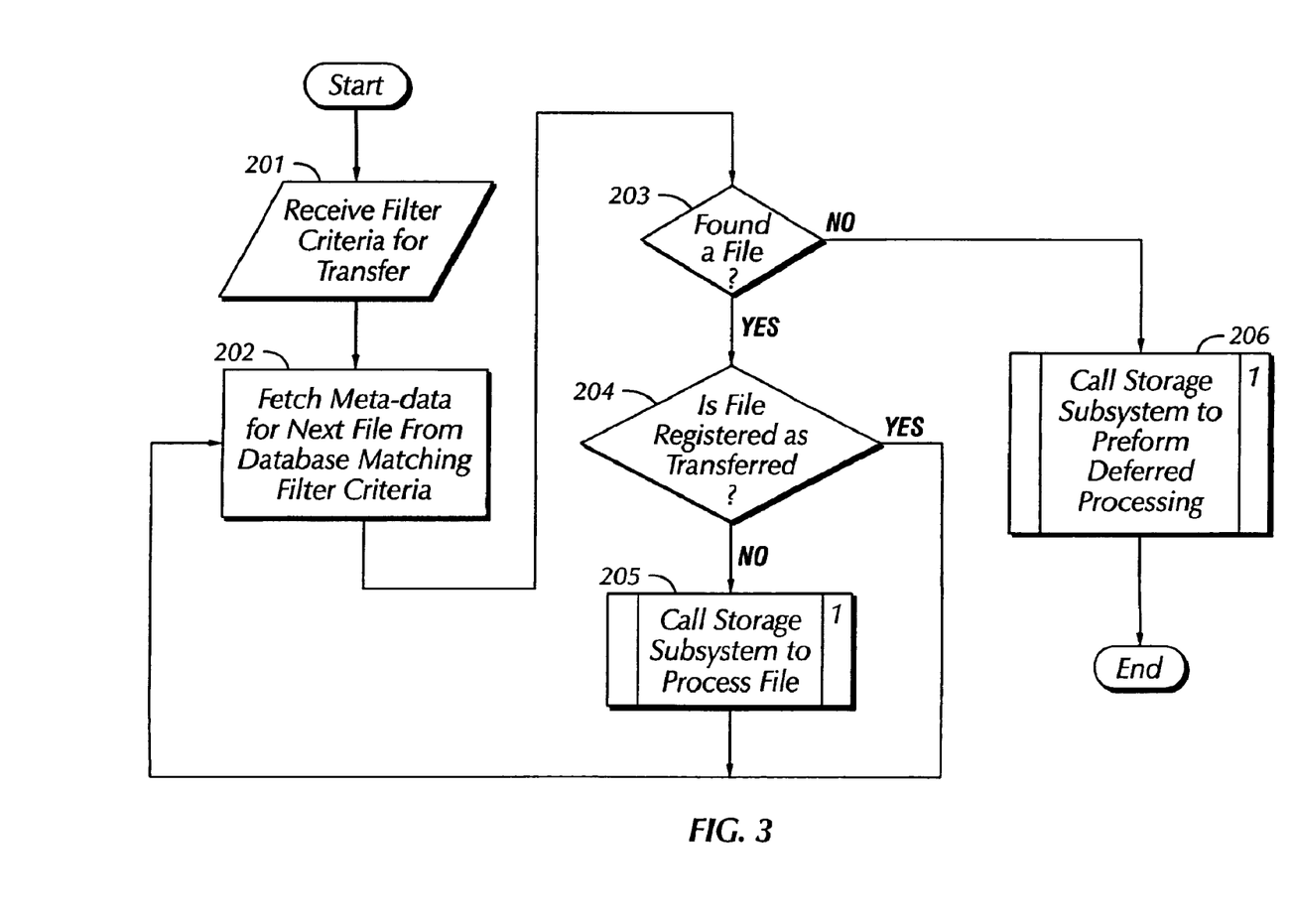
FIG. 3 is a flowchart of the inventory component, according to the preferred embodiments of the present invention.
Figure 4:
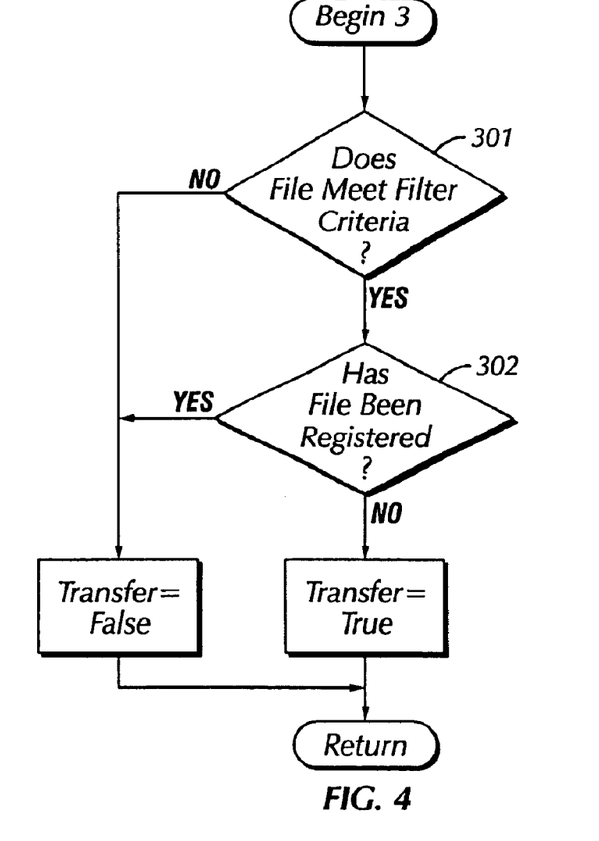
FIG. 4 is a flowchart of the inventory component process 3, according to the preferred embodiments of the present invention.
Figure 5:
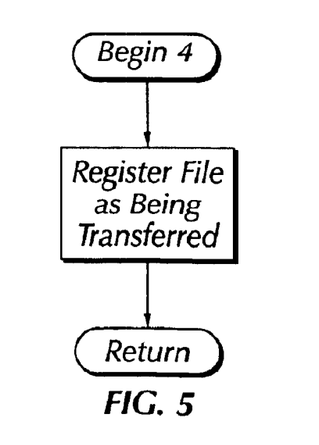
FIG. 5 is a flowchart of the inventory component process 4, according to the preferred embodiments of the present invention.

Accordingly to exemplary embodiments of the present invention, the inventory component flowcharts are presented in FIGS. 3, 4, and 5. A copy set is typically generated upon command from a storage administrator, who specifies the selection criteria for files in the copy set. These criteria, received in step 201 of FIG. 3, include some selection attributes, such as the name of the client node, the filespaces to which files may belong, the type of files to be included (e.g., backup or archive), and a pattern-matching expression for the file names.

The inventory component uses tables or lists in the server's database for locating files which satisfy the filter criteria given by the selection attributes, as shown in step 202. As the copy set is generated, this component also constructs a temporary table or list which contains an entry for each file that has already been copied to the copy set. The temporary table is used to avoid duplicating the same file within the copy set, but can also facilitate construction of a catalog of files in the copy set.

The inventory component scans the server's database tables, such as the file inventory list 80 in FIG. 2, searching for every file that satisfies the specified filter criteria. Depending on the filter criteria and the organization of the database tables, this can usually be done very efficiently. As it encounters each matching file, found in step 203, the inventory component checks its temporary table to see if the file has already been included in the copy set and registered, according to step 204. If not, the inventory component invokes the storage component, in step 205, to request that this file be copied to the copy set. The matching file is specified to the storage component using a unique identifier, the bfid 110, for that file, which is common to both the inventory and storage component views. If no matching file is found in step 203, the storage component is invoked in step 206 to perform deferred processing. Steps 202–205 are repeated for all files from the database matching the filter criteria.

The inventory component of the exemplary embodiment provides two call-back routines that can be invoked from the storage component. The first call-back routine determines, for any specific file found on a storage volume, whether that file should be added to the copy set. An affirmative response is given if and only if the file satisfies the filter criteria (determined by checking database information against the specific filter criteria) and has not already been added to the copy set (determined by looking up the file in the temporary table). FIG. 4 illustrates the inventory component executing this call-back routine to check whether a file should be transferred. In step 301 it first determines whether the file meets filter criteria and, if so, it checks in step 302 whether the file has already been registered as transferred.

The second call-back routine provides the ability for the storage component to notify the inventory component that it has successfully copied a file to the copy set. Upon notification, the inventory component adds the file to the temporary table to avoid duplication of files in the copy set. FIG. 5 illustrates the inventory component executing a call-back routine that registers a file as transferred with the inventory component.

After the inventory component has identified all matching files and requested that these be added to the copy set, it invokes the storage component one last time to perform any residual processing in step 206 of FIG. 3. This allows the storage component to defer processing of files stored at secondary locations until all other work has been completed.

Storage Component

The storage component provides an entry point that is invoked by the inventory component to request that a specific file be added to the copy set. The storage component does not necessarily satisfy these requests in the order they are received, since that would be inefficient. Instead, the storage component processes the requested file in conjunction with other files that are stored in close proximity.

In view of the problems associated with various types of media discussed in the background herein, there may be considered two classes of media from which data can be transferred according to the present invention. The first class, including media that is removable, sequential, or otherwise inefficient for data access and transfer, is handled in a way to minimize delays and thereby achieve efficiency. The second class, including media that is both non-removable and random-access, is handled in another way because data transfer from such media is inherently efficient. The present invention provides a solution to currently-known inefficiencies in the copying of files from media that is sequential-access.

Figure 6:
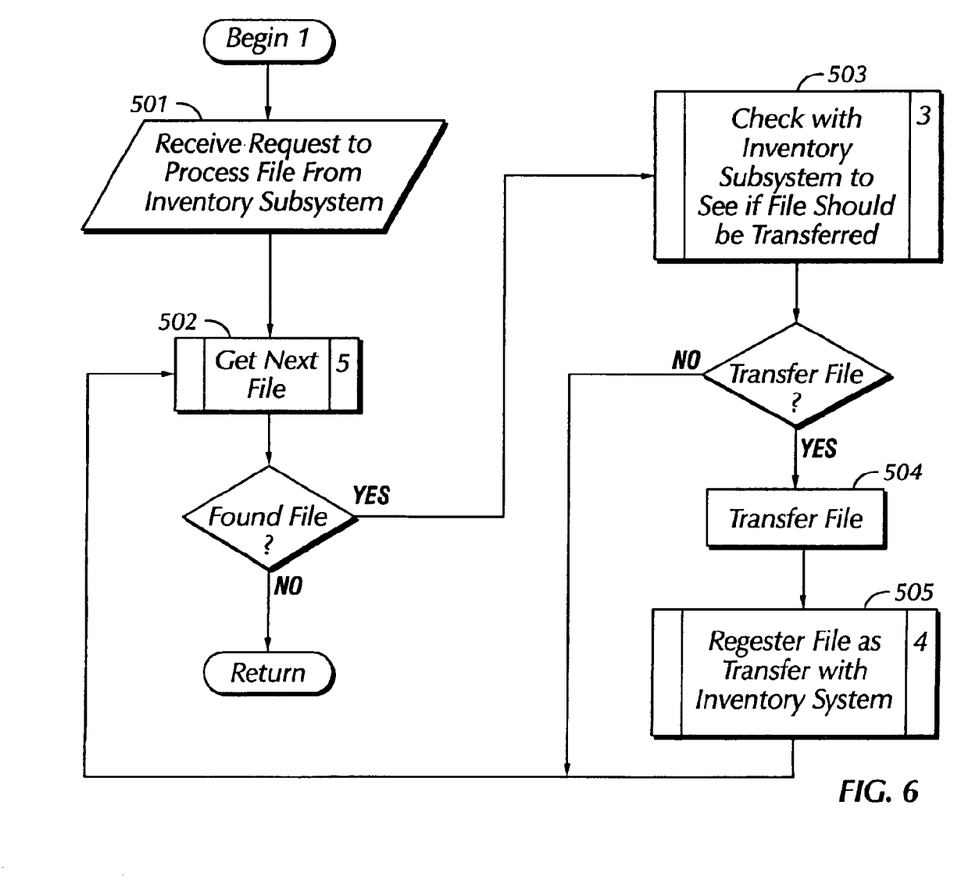
FIG. 6 is a flowchart of the storage component, according to the preferred embodiments of the present invention.
Figure 7:
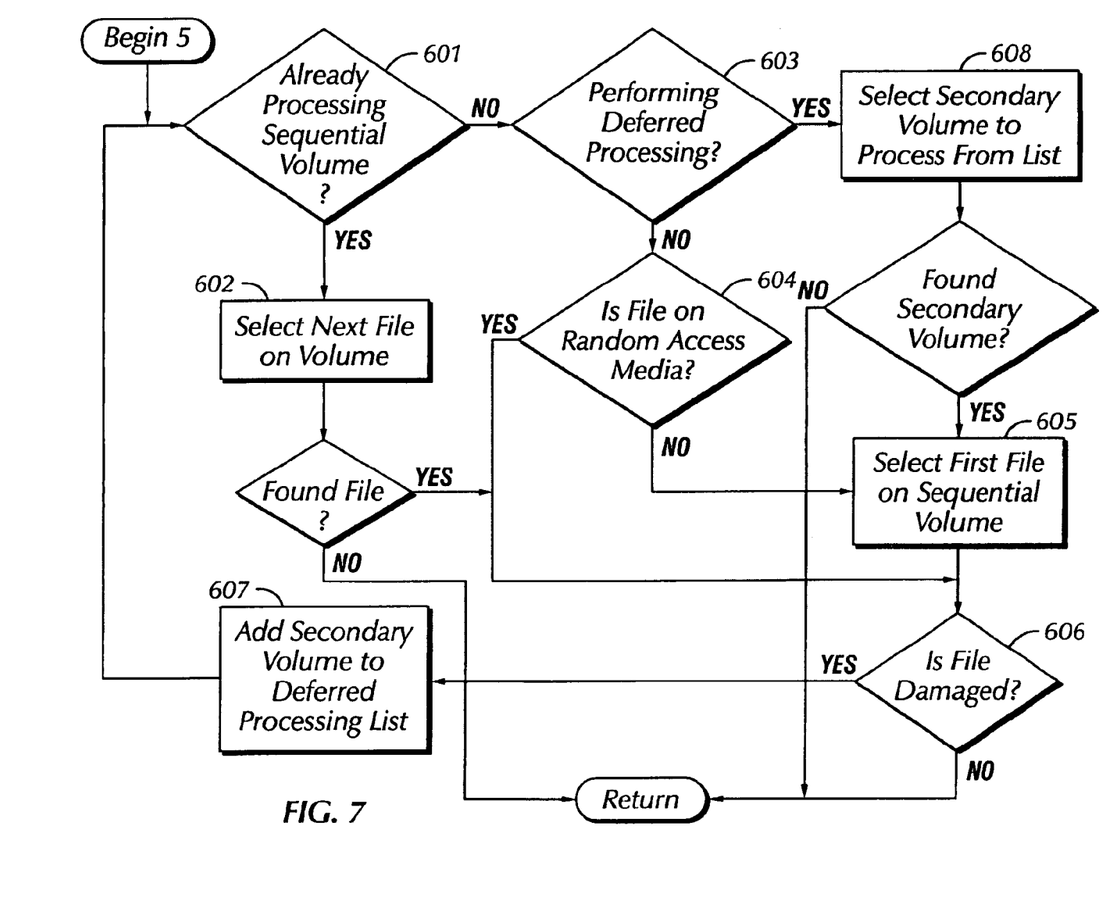
FIG. 7 is a flowchart of the storage component process 5, according to the preferred embodiments of the present invention.

According to the preferred embodiments of the present invention, the storage component flowcharts are represented in FIGS. 6 and 7. In step 501 a request is received from the inventory component to process a file. A routine is invoked in step 502 to get the next file. If no file is found, the storage component returns. If a file is found, in step 503 the inventory component call-back routine of FIG. 4 is invoked to verify whether the file should be transferred. If not, step 502 is performed to get another file. If the file should be transferred, it is transferred in step 504, the inventory component call-back routine is invoked in step 505 to register the file, and control is returned to step 502 to get the next file.

In step 502 of FIG. 6, for every request to copy a file to the copy set, the storage component iteratively performs the following steps of FIG. 7 until it returns.

In step 601 it is checked whether the storage component has previously begun retrieving files from a sequential-access volume and, if so, in step 602 the next file on that volume is selected. If a file spans into another sequential-access volume, the routine returns and the spanned-into volume becomes the current volume for the next file to be selected on that volume in the next routine run.

If a sequential volume is not currently being processed, in step 603 it is tested whether the method is already performing deferred processing of secondary volumes. If in step 604 it is determined that the file can be accessed on random-access media, it is immediately selected. Otherwise, if the file can be accessed on a primary sequential-access volume, that volume is selected from processing and the first file on that volume is selected in step 605. If the file is damaged, according to step 606, and can only be accessed on a secondary volume, that volume is placed on a list for deferred processing in step 607. Deferred processing of secondary volumes avoids thrashing that would be caused if a secondary volume were immediately mounted and used for transfer of files.

In step 608 for sequential copying from secondary volumes, when the inventory component has requested that residual (deferred) processing be performed, the next deferred secondary volume becomes the current volume and the first file on that volume is selected in step 605.

After performing the processing described above, the storage component returns to the inventory component for a new request.

Figure 8:
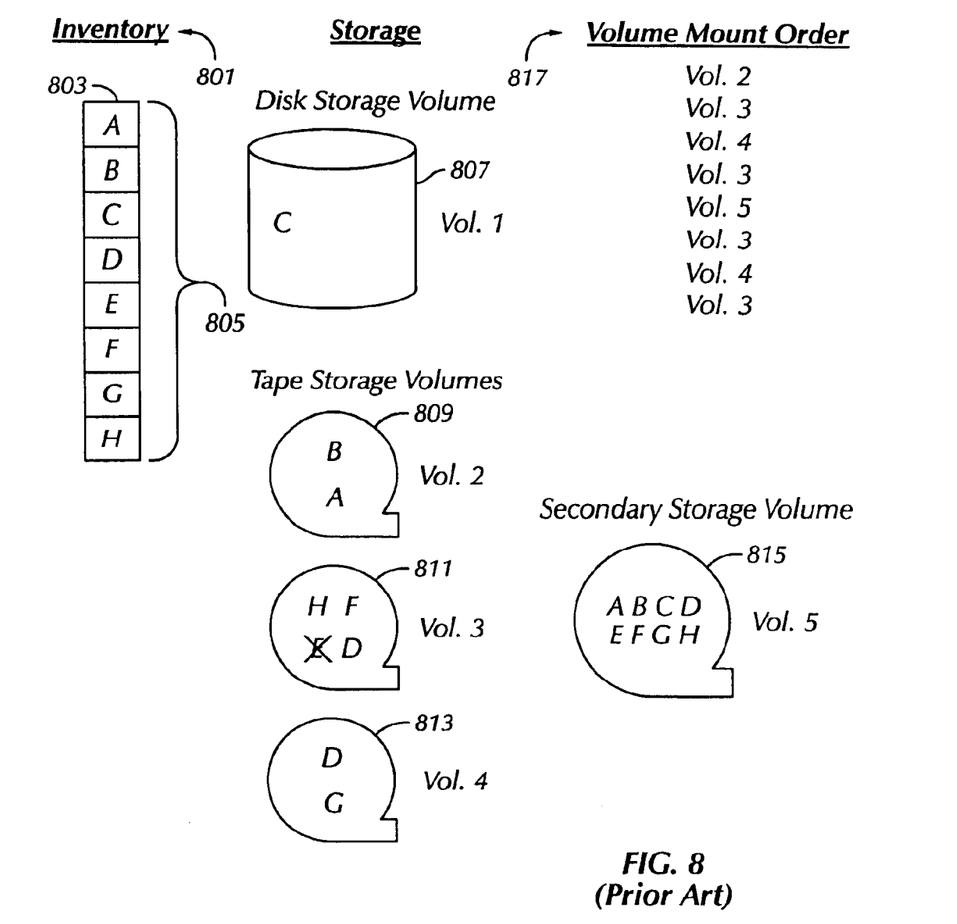
FIG. 8 is a diagram showing volume mounting order, according to the prior art.

FIG. 8 is a diagram showing an example of a file inventory list and its associated volume mounting order according to the prior art. In this example, the inventory view 801 is depicted as an inventory list 803 that stores information about database files. Each file has an individual entry 805 such as the file inventory list entry 100 depicted in FIG. 2. The list 801 is ordered relative to file attributes such as the username and filename. According to prior art methods, the files 805 in the inventory list 801 are requested in the same order in which they appear in the list 801, and are located and copied from storage media in that order as well.

Primary copies of the files are stored on either disk storage volume 807 or tape storage volumes 809 through 813. Secondary copies of the files are stored on separate tapes storage volume 815. In this example, as each file 805 in the inventory list 801 is requested, the method transfers the file from disk storage, if possible. If the file is stored only on sequential media, its corresponding volume is mounted and located such that the file may be accessed and copied. Therefore, to access file A, VOL2 809 is mounted and subsequently positioned to retrieve file A at the end of the tape. File B is requested next, requiring the same tape, VOL2 809, to be re-positioned such that file B may be copied from the beginning of that tape. File C is then copied from disk storage 807. File D is requested next, and requires the removal of VOL2 809, the mounting of VOL3 811, location of the first portion of file D at the end of the volume 811, removal of the volume 811 and mounting of VOL4 813, and location of the latter portion of file D on that volume 813. File E then requires removal of VOL4 813, re-mounting of VOL3 811, and re-positioning of VOL3 811 to the location of file E, which is found to be corrupted. At that point, secondary VOL5 815 would be mounted immediately for the retrieval of file E. File F requires VOL3 811 to be remounted and repositioned, and file G induces the removal of VOL3 811 and re-mounting of VOL4 813. Finally, file H is located by removing VOL4 813, re-mounting VOL3 811 and re-locating to the beginning of that tape. The lengthy volume mount order is listed at 817 in FIG. 8. The example detailed in this diagram is exemplary of the inefficiently inherent in the request and copy of copy data according to methods known in the prior art.

Figure 9:
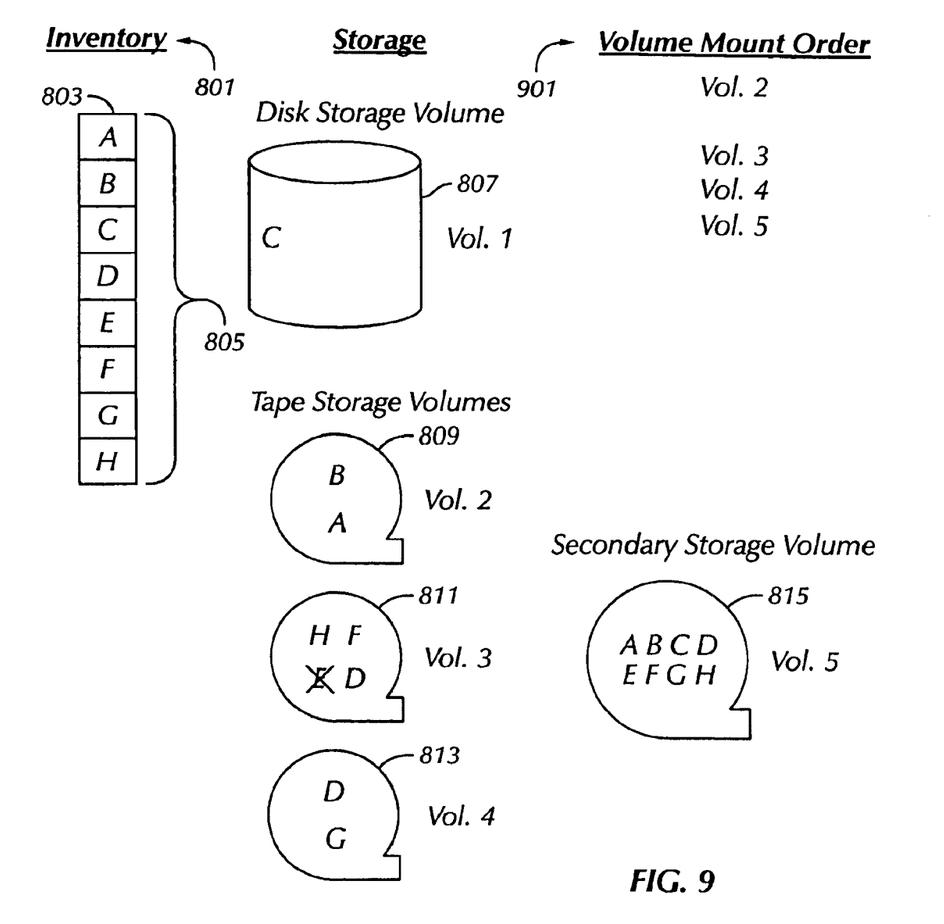
FIG. 9 is a diagram showing volume mounting order, according to the preferred embodiments of the present invention.

The present invention reduces this inefficiency by optimizing the retrieval of the same files on the same storage volumes utilizing an exemplary method of the invention. Referring to FIG. 9, the file inventory list 801 contains the same files in the same order as the previous example. File A requires the mounting of VOL2 809. Before positioning to the very end of the tape 809, however, the method notes the prior incidence of file B and queries the inventory list 801 for future requests of file B. Noting such a future request, file B is immediately copied by the method, and then file A is copied. The next file in the inventory list is file B, which was already copied in the last step. The method then moves to file C, which is copied from disk storage 807. File D requires the removal of VOL2 809 and the mounting of VOL3 811, however, each of files H, F, and E are encountered on the volume 811 before file D. The inventory list 801 is again queried for anticipated requests of these files. They are found to be future entries in the list 801 and are therefore copied immediately, except for file E which is corrupted and results in VOL5 815 being designated for deferred processing. The end of VOL3 811 is finally reached and the first part of file D is copied. Continuation of file D on another volume, VOL4 813 requires the removal of VOL3 811 and the mounting of VOL4 813. The method then transfers file G, which is copied directly from the currently mounted and properly positioned VOL4 813. The next three entries in the inventory list, files E, F and G, have already been accounted for in previous steps and are therefore skipped. The last file in the list 801 is file H, which has already been copied from the beginning of VOL3 811. Finally, VOL5 815, which was previously designated for deferred processing, must be mounted for the retrieval of file E. At this point, all of the files have been successfully copied. The shortened mount order is shown at 901 in FIG. 9.

The example as handled by the prior art, shown in FIG. 8, requires 8 separate mounting procedures (excluding retrieval from a disk storage volume) 817, while the same example as handled by a method according to the present invention requires only 4 separate mounting procedures 901. It can clearly be seen that the present invention significantly reduces the mounting and positioning required for acquisition and copying of copy data files. As one of the most expensive operations in storage hierarchy methods is volume mounting and positioning, the present invention directly provides for significant time and cost reductions.

The inventory and storage component of the present invention are implemented in the present invention as software programs being part of the storage management server system of FIG. 1. These software programs can be stored on a storage medium for storing executable computer instructions, such as a magnetic diskette, an optical disk cartridge, or a magnetic tape cartridge, or in memories used to store digital representations of executable computer instructions, such as read-only memory (ROM) or programmable memory (PROM).

The foregoing description of the preferred embodiment of the invention has been presented for the purposes of illustration and description. It is not intended to be exhaustive or to limit the invention to the precise form disclosed. Many modifications and variations are possible in light of the above teaching. For example, the invention may be applied to the transfer of all files, and is not limited to only the most recent files or the generation of a copy set. Determination of position-optimal copying order may be in consideration of media format in addition to file position on the media. For example, consideration of file location on serpentine tape would be different than that for sequential tape, and would be done so as to minimize the number of tape passes. Another modification may involve the invention utilizing a network for file transfer between a client and a server, in contrast to utilization of removable media. Also, those skilled in the art will appreciate that the invention may be utilized with systems involving file aggregation, whereby all matching files would be transferred from within an aggregate once processing of that aggregate has begun. It is intended that the scope of the invention be limited not by this detailed description, but rather by the claims appended hereto.

What is claimed is:

1. A method for transferring files stored on multiple separate storage volumes using information from a list in such a way as to minimize mounting and positioning of the storage volumes, the method comprising:

receiving a request specifying selection criteria for selecting a first file to be included in a copy set, wherein the request includes a file order;

identifying a first matching file meeting the selection criteria;

locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;

identifying any other matching files on the storage volume that has the first matching file;

determining a copying order of the first matching file and the any other matching files on the storage volume that has the first matching file, wherein the file order in the request is ignored when determining the copying order, and wherein the copying order is determined by, volume, then position, and then bfid; and copying the first matching file and the any other matching files identified on the storage volume that has the first matching file, from the storage volume that has the first matching file to a copy set according to the determined copying order, wherein no matching files are duplicated in the copy set; and wherein the copying operation further comprises determining if the first matching file cannot be accessed due to a media defect, and if the first matching file cannot be accessed due to a media defect, then the copying operation does not include copying the first matching file to the copy set, and the method further comprises determining if the first matching file resides on a secondary volume, and if the first matching file resides on a secondary volume, then the method further comprises adding the secondary volume to a deferred processing list.

2. The method of claim 1 wherein the method further comprises transferring a file on the deferred processing list from the secondary volume.

3. A method for transferring files stored on multiple separate storage volumes using information from a list in such a way as to minimize mounting and positioning of the storage volumes, the method comprising:

receiving a request specifying selection criteria for selecting a first file to be included in a copy set, wherein the request includes a file order;

identifying a first matching file meeting the selection criteria;

locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;

identifying any other matching files on the storage volume that has the first matching file;

determining a copying order of the first matching file and the any other matching files on the storage volume that has the first matching file, wherein the file order in the request is ignored when determining the copying order, and wherein the copying order is determined by, volume, the position, and then bfid; and copying the first matching file and the any other matching files identified on the storage volume that has the first matching file, from the storage volume to a copy set according to the determined copying order, wherein no matching files are duplicated in the copy set; and wherein the storage volumes comprise removable and non removable sequential access volumes and random access volumes; and wherein the storage volume that has the first matching file is a sequential access volume, and wherein the copying operation comprises copying the first matching file and the any other matching files to the copy set in an order in which they are stored on the sequential access storage volume; and wherein the first matching file stored on the storage volume is a primary copy of the first matching file; and wherein a secondary copy of the first matching file is stored on a sequential access volume;

and further comprising deferring copying from the sequential access volume having the secondary copy of the first matching file until all copying from the storage volume that has the primary copy of the first matching file has been completed.

4. The method of claim 3 wherein a matching file that spans from a first volume to a second volume is copied from the first volume and then from the second volume, and all matching files on the second volume are copied before the second volume is dismounted.

5. An apparatus comprising:

a computer having data storage volumes connected thereto; and one or more computer programs, performed by the computer, for generating a copy set in such a way as to minimize mounting and positioning of the storage volumes, the generating comprising:
- receiving a request specifying selection criteria for selecting a first file to be included in a copy set, wherein the request includes a file order;
- identifying a first matching file meeting the selection criteria;
- locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;
- identifying any other matching files on the storage volume that has the first matching file;
- determining a copying order of the first matching file and the any other matching files on the storage volume that has the first matching file, wherein the file order in the request is ignored when determining the copying order, and wherein the copying order is determined by, volume, then position, and then bfid; and
- copying the first matching file and the any other matching files identified on the storage volume that has the first matching file, from the storage volume that has the first matching file to a copy set according to the determined copying order, wherein no matching files are duplicated in the copy set; and
- wherein the copying operation further comprises determining if the first matching file cannot be accessed due to a media defect, and if the first matching file cannot be accessed due to a media defect, then the copying operation does not include copying the first matching file to the copy set, and the generating further comprises determining if the first matching file resides on a secondary volume, and if the first matching file resides on a secondary volume, then the generating further comprises adding the secondary volume to a deferred processing list.

6. The apparatus of claim 5 wherein the generating further comprises transferring a file on the deferred processing list from a secondary volume.

7. An apparatus comprising:
- a computer having data storage volumes connected thereto; and
- one or more computer programs, performed by the computer, for generating a copy set in such a way as to minimize mounting and positioning of the storage volumes, the generating comprising:
  - receiving a request specifying selection criteria for selecting a first file to be included in a copy set, wherein the request includes a file order;
  - identifying a first matching file meeting the selection criteria;
  - locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;
  - identifying any other matching files on the storage volume that has the first matching file;
  - determining a copying order of the first matching file and the any other matching files on the storage volume that has the first matching file, wherein the file order in the request is ignored when determining the copying order, and wherein the copying order is determined by, volume, then position, and then bfid; and
  - copying the first matching file and the any other matching files identified on the storage volume that has the first matching file, from the storage volume to a copy set according to the determined copying order, wherein no matching files are duplicated in the copy set; and
  - wherein the storage volumes comprise removable and non removable sequential access volumes and random access volumes; and
  - wherein the storage volume that has the first matching file is a sequential access volume, and wherein the copying operation comprises copying the first matching file and the any other matching files to the copy set in an order in which they are stored on the sequential access storage volume; and
  - wherein the first matching file stored on the storage volume is a primary copy of the first matching file; and
  - wherein a secondary copy of the first matching file is stored on a sequential access volume;
  - and further comprising deferring copying from the sequential access volume having the secondary copy of the first matching file until all copying from the storage volume that has the primary copy of the first matching file has been completed.

8. An article of manufacture comprising a computer program carrier readable by a computer and embodying one or more instructions executable by the computer for generating a copy set in such a way as to minimize mounting and positioning of storage volumes, the generating comprising:
- receiving a request specifying selection criteria for selecting a first file to be included in a copy set, wherein the request includes a file order;
- identifying a first matching file meeting the selection criteria;
- locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;
- identifying any other matching files on the storage volume that has the first matching file;
- determining a copying order of the first matching file and the any other matching files on the storage volume that has the first matching file, wherein the file order in the request is ignored when determining the copying order, and wherein the copying order is determined by, volume, then position, and then bfid; and
- copying the first matching file and the any other matching files identified on the storage volume that has the first matching file, from the storage volume to a copy set according to the determined copying order, wherein no matching files are duplicated in the copy set; and
- wherein the copying operation further comprises determining if the first matching file cannot be accessed due to a media defect, and if the first matching file cannot be accessed due to a media defect, then the copying operation does not include copying the first matching file to the copy set, and the generating further comprises determining if the first matching file resides on a secondary volume, and if the first matching file resides on a secondary volume, then the generating further comprises adding the secondary volume to a deferred processing list.

9. The article of claim 8 wherein the generating further comprises transferring a file on the deferred processing list from a secondary volume.

10. An article of manufacture comprising a computer program carrier readable by a computer and embodying one or more instructions executable by the computer for generating a copy set in such a way as to minimize mounting and positioning of storage volumes, the generating comprising:

receiving a request specifying selection criteria for selecting a first file to be included in a copy set, wherein the request includes a file order;

identifying a first matching file meeting the selection criteria;

locating the first matching file on one of the storage volumes, wherein locating the first matching file on one of the storage volumes comprises searching entries in a storage reference list, first for a storage pool identifier, then for a bfid, then for a storage volume identifier, and then for a position within the storage volume that has the first matching file;

identifying any other matching files on the storage volume that has the first matching file;

determining a copying order of the first matching file and the any other matching files on the storage volume that has the first matching file, wherein the file order in the request is ignored when determining the copying order, and wherein the copying order is determined by, volume, then position, and then bfid; and copying the first matching file and the any other matching files identified on the storage volume that has the first matching file, from the storage volume to a copy set according to the determined copying order, wherein no matching files are duplicated in the copy set; and wherein the storage volumes comprise removable and non removable sequential access volumes and random access volumes; and wherein the storage volume that has the first matching file is a sequential access volume, and wherein the copying operation comprises copying the first matching file and the any other matching files to the copy set in an order in which they are stored on the sequential access storage volume; and wherein the first matching file stored on the storage volume is a primary copy of the first matching file; and wherein a secondary copy of the first matching file is stored on a sequential access volume;

and further comprising deferring copying from the sequential access volume having the secondary copy of the first matching file until all copying from the storage volume that has the primary copy of the first matching file has been completed.

11. The method of claim 2, wherein the method further comprises constructing, with an inventory component, while the copy set is generated, a temporary table which contains an entry for each file that has been copied to the copy set, to avoid duplication of files in the copy set.

12. The method of claim 11, wherein the other matching files are files that are encountered on the storage volume before encountering the first matching file, and wherein the method further comprises determining if any of the other matching files are on an inventory list.

13. The method of claim 12:

wherein the first matching file is copied immediately if the storage volume that has the first matching file is a random access media; and wherein the method further comprises mounting the storage volume that has the first matching file, if the storage volume that has the first matching file is a sequential media.

14. The method of claim 3, wherein the copying operation further comprises determining if the first matching file cannot be accessed due to a media defect, and if the first matching file cannot be accessed due to a media defect, then the copying operation does not include copying the first matching file to the copy set, and the method further comprises adding the secondary volume to a deferred processing list.

15. The apparatus of claim 5, wherein the generating further comprises constructing, with an inventory component, while the copy set is generated, a temporary table which contains an entry for each file that has been copied to the copy set, to avoid duplication of files in the copy set, and wherein the other matching files are files that are encountered on the storage volume before encountering the first matching file, and wherein the generating further comprises determining if any of the other matching files are on an inventory list.

16. The apparatus of claim 7, wherein the copying operation further comprises determining if the first matching file cannot be accessed due to a media defect, and if the first matching file cannot be accessed due to a media defect, then the copying operation does not include copying the first matching file to the copy set, and the generating further comprises adding the secondary volume to a deferred processing list.

17. The article of claim 8, wherein the generating further comprises constructing, with an inventory component, while the copy set is generated, a temporary table which contains an entry for each file that has been copied to the copy set, to avoid duplication of files in the copy set, and wherein the other matching files are files that are encountered on the storage volume before encountering the first matching file, and wherein the generating further comprises determining if any of the other matching files are on an inventory list.

18. The article of claim 10, wherein the copying operation further comprises determining if the first matching file cannot be accessed due to a media defect, and if the first matching file cannot be accessed due to a media defect, then the copying operation does not include copying the first matching file to the copy set, and the generating further comprises adding the secondary volume to a deferred processing list.

* * * * *

UNITED STATES PATENT AND TRADEMARK OFFICE
CERTIFICATE OF CORRECTION

PATENT NO.   : 6,886,019 B1
DATED        : April 26, 2005
INVENTOR(S)  : Cannon et al.

It is certified that error appears in the above-identified patent and that said Letters Patent is hereby corrected as shown below:

Column 12,
Line 35, replace "the position" with -- then position --.

Signed and Sealed this

Sixteenth Day of August, 2005

JON W. DUDAS
*Director of the United States Patent and Trademark Office*